United States Patent
Inoue

(10) Patent No.: US 8,083,640 B2
(45) Date of Patent: Dec. 27, 2011

(54) APPARATUS AND METHOD FOR CONTROLLING CONTINUOUSLY VARIABLE TRANSMISSION AND PROGRAM FOR PERFORMING THE CONTROL METHOD

(75) Inventor: Daisuke Inoue, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 587 days.

(21) Appl. No.: 12/299,622

(22) PCT Filed: Oct. 12, 2007

(86) PCT No.: PCT/IB2007/003502
§ 371 (c)(1),
(2), (4) Date: Nov. 5, 2008

(87) PCT Pub. No.: WO2008/044143
PCT Pub. Date: Apr. 17, 2008

(65) Prior Publication Data
US 2009/0176618 A1     Jul. 9, 2009

(30) Foreign Application Priority Data
Oct. 13, 2006   (JP) .................................. 2006-280462

(51) Int. Cl.
*F16H 61/662* (2006.01)
(52) U.S. Cl. ........................................ 477/46; 477/44
(58) Field of Classification Search ................ 477/44, 477/45, 46
See application file for complete search history.

(56) References Cited

U.S. PATENT DOCUMENTS

| | | | |
|---|---|---|---|
| 5,700,224 A | 12/1997 | Suzuki et al. | |
| 6,443,871 B2 * | 9/2002 | Taniguchi et al. | 477/44 |
| 6,461,261 B2 * | 10/2002 | Yamamoto et al. | 474/8 |
| 6,800,049 B2 * | 10/2004 | Leising et al. | 477/39 |
| 2006/0172829 A1 * | 8/2006 | Ishio | 474/18 |
| 2008/0004141 A1 * | 1/2008 | Toyoda et al. | 474/28 |

FOREIGN PATENT DOCUMENTS

| | | |
|---|---|---|
| JP | 61 52457 | 3/1986 |
| JP | 2 102960 | 4/1990 |
| JP | 8 210450 | 8/1996 |
| JP | 8 210453 | 8/1996 |
| JP | 2001 330120 | 11/2001 |
| JP | 2002 310276 | 10/2002 |
| JP | 2002 327835 | 11/2002 |

* cited by examiner

*Primary Examiner* — Ha D. Ho
(74) *Attorney, Agent, or Firm* — Oblon, Spivak, McClelland, Maier & Neustadt, L.L.P.

(57) ABSTRACT

An apparatus and method for controlling a CVT (continuously variable transmission), and a program for executing the control method that reduces a transmission shock during a braking operation. When a foot brake switch is turned on and a vehicle speed is less than or equal to a threshold speed, the ECU increases a clamping pressure applied to a transmission belt to a pressure level higher than a normal pressure. When the vehicle speed falls to or below the threshold speed when the foot brake switch is turned on, the ECU prohibits an increase in the clamping pressure applied to the transmission belt.

24 Claims, 12 Drawing Sheets

APPARATUS AND METHOD FOR CONTROLLING CONTINUOUSLY VARIABLE TRANSMISSION AND PROGRAM FOR PERFORMING THE CONTROL METHOD

BACKGROUND OF THE INVENTION

1. Field of the Invention

The present invention relates, in general, to an apparatus and method for controlling a continuously variable transmission (CVT) and a program for performing the control method. In particular, the invention relates to a technology for controlling the clamping pressure of the transmission belt of the CVT.

2. Description of the Related Art

In the related art, a continuously variable transmission (CVT), in which a transmission belt clamps a pair of pulleys having a variable groove width, is known. In the CVT, clamping pressure of the transmission belt prevents slippage of the transmission belt on the pulleys. However, during a quick braking operation of a vehicle, the output speed of the CVT is quickly reduced, so that torque applied to the transmission belt is excessively increased. In the above state, the transmission belt may slip on the pulleys due to the excessively increased torque, To prevent the slippage of the transmission belt on the pulleys in the CVT during a quick braking operation, a technique of increasing the clamping pressure of the transmission belt during the quick braking operation has been proposed.

Japanese Patent Laid-Open Publication No. H8-210450 describes a line pressure control apparatus for appropriately controlling the line pressure in a V-belt type CVT such that the line pressure does not become higher or lower than reference levels during a braking operation of a vehicle. In the V-belt type CVT using the line pressure control apparatus disclosed in Japanese Patent Laid-Open Publication No. H8-210450, line pressure is applied to a movable flange of the first pulley of a pair of pulleys clamped by a V-belt, while transmission control pressure, which is obtained by reducing the line pressure using a transmission control valve, is applied to a movable flange of the second pulley. Thus, the V-belt type CVT continuously controls the transmission ratio using the difference between the transmission control pressure and the line pressure. The line pressure control apparatus described in Japanese Patent Laid-Open Publication No. H8-210450 comprises a braking operation detecting unit for detecting a braking operation of a vehicle equipped with the V-belt type CVT, a transmission ratio calculating unit for calculating an actual transmission ratio of the V-belt type CVT, and a line pressure increase unit for increasing the line pressure to a level determined according to the actual transmission ratio during the braking operation of the vehicle.

According to the line pressure control apparatus described in Japanese Patent Laid-Open Publication No. H8-210450, the line pressure during a braking operation is increased to the level determined according to the actual transmission ratio of the V-belt type CVT. Thus, although the wheels of the vehicle during the braking operation are quickly braked and the speed of the vehicle is quickly reduced by the braking operation, the line pressure in the V-belt type CVT can be appropriately controlled such that the V-belt can be prevented from slippage on the pulleys. Therefore, the line pressure control apparatus improves the durability of the V-belt.

However, in the line pressure control apparatus described in Japanese Patent Laid-Open Publication No. H8-210450, the line pressure during a braking operation of a vehicle is increased. Thus, when a braking operation is executed while the vehicle is driven at a high speed, the clamping pressure of the V-belt is increased. Meanwhile, when the speed of the vehicle is high, excessive torque is not applied to the transmission belt. Thus, it is considered to increase the clamping pressure of the transmission belt when the braking operation performs while the vehicle is driven at a low speed. However, when the braking operation is started while the vehicle is driven at a high speed, the clamping pressure of the transmission belt is increased stepwisely at the time that the speed of the vehicle has been reduced to a predetermined low speed, so that the clamping pressure of the transmission belt may deviate from the brake operation timing, and may cause a transmission shock.

SUMMARY OF THE INVENTION

The present invention provides an apparatus and method for controlling a CVT (continuously variable transmission) such that a transmission shock is reduced and a program for performing the control method.

In a first aspect, the present invention provides a control apparatus for a belt-type CVT. The control apparatus includes: a brake operation determining unit that determines whether a brake of a vehicle is being operated; a vehicle speed determining unit that determines whether the vehicle speed is less than or equal to a predetermined reference speed; a clamping pressure control unit that controls the clamping pressure applied to the transmission belt, wherein the clamping pressure control unit increases the clamping pressure when the brake operation determining unit determines that the brake is operated and the vehicle speed is less than or equal to the predetermined reference speed; and a clamping-pressure increase prohibition unit that prohibits increasing the clamping pressure applied to the transmission belt when the vehicle speed falls to or below the predetermined reference speed when the brake operation determining unit determines that the brake is being operated. A control method for a CVT in accordance with the present invention includes the same conditions as the control apparatus for a CVT in accordance with the second aspect of the present invention.

According to the first aspect, it is determined whether the brake of the vehicle is being operated and whether the speed of the vehicle is less than or equal to the predetermined reference speed. When it is determined that the brake is being operated and the vehicle speed is less than or equal to the predetermined reference speed, the clamping pressure applied to the transmission belt is increased. Further, when the vehicle speed falls to or below the predetermined reference speed when it is determined that the brake is being operated, an increase in the clamping pressure applied to the transmission belt is prohibited. Also, the clamping pressure control unit increases the clamping pressure above a normal clamping pressure, which is set as the clamping pressure when the brake is not operated. Thus, when the vehicle speed falls to or below the predetermined reference speed, the stepwise increase in the clamping pressure of the transmission belt is prohibited. Thus, an apparatus and a method for controlling a CVT to reduce a transmission shock are provided.

A control apparatus of a CVT in accordance with a second aspect of the present invention may further include a vehicle deceleration determining unit that determines whether deceleration of the vehicle is less than or equal to a predetermined reference deceleration. The clamping pressure increase prohibition unit prohibits increases in the clamping pressure when the deceleration of the vehicle is less than or equal to the predetermined reference deceleration if the vehicle speed falls to or below the predetermined reference speed when the brake is being operated. A control method for a CVT in accordance with the present invention includes the same conditions as the control apparatus for a CVT in accordance with the second aspect of the present invention.

According to the second aspect, it is determined whether the deceleration of the vehicle is less than or equal to a predetermined reference deceleration. When the deceleration of the vehicle is less than or equal to the predetermined reference deceleration, the increase in the clamping pressure applied to the transmission belt is prohibited. Thus, during a quick braking operation, in which the deceleration of the vehicle is higher than the predetermined reference deceleration, the clamping pressure applied to the transmission belt may be increased. However, during a smooth and gradual braking operation, in which the deceleration of the vehicle is less than or equal to the predetermined reference deceleration, increases in the clamping pressure applied to the transmission belt are prohibited. Thus, when excessive torque is applied to the transmission belt, the slippage of the transmission belt on the pulleys may be reduced by increasing the clamping pressure applied to the transmission belt. However, when excessive torque is not applied to the transmission belt, an increase in the clamping pressure applied to the belt is avoided and a shock is reduced.

A control apparatus of a CVT in accordance with a third aspect of the present invention may further includes an elapsed time determining unit that determines whether time elapsed since operation of the brake is greater than or equal to a predetermined reference time. The clamping pressure increase prohibition unit prohibits increases in the clamping pressure applied to the transmission belt when the elapsed time since operation of the brake is greater than or equal to the predetermined reference time if the vehicle speed falls to or below the predetermined reference speed when the brake is being operated. A control method for a CVT in accordance with the present invention includes the same conditions as the control apparatus for a CVT in accordance with the third aspect of the present invention.

According to the third aspect, it is determined whether the elapsed time since operation of the brake is greater than or equal to the predetermined reference time. When it is determined that the elapsed time since the operation of the brake is greater than or equal to the predetermined reference time if the vehicle speed falls to or below the predetermined reference speed when the brake is being operated, an increase in the clamping pressure of the transmission belt is prohibited. Thus, when it is determined that the time elapsed since the operation of the brake is less than the predetermined reference time and it is thus recognized that the vehicle is undergoing a quick braking operation, the clamping pressure applied to the transmission belt may be increased. Meanwhile, when it is determined that the time elapsed since the operation of the brake is greater than or equal to the predetermined reference time and it is thus recognized that the vehicle is undergoing a smooth and gradual braking operation, an increase in the clamping pressure applied to the transmission belt is prohibited. Thus, when excessive torque is applied to the transmission belt, the slippage of the transmission belt on the pulleys can be reduced by increasing the clamping pressure applied to the transmission belt. However, when excessive torque is not applied to the transmission belt, an increase in the clamping pressure applied to the transmission belt is avoided and a transmission shock is reduced.

In a forth aspect, the present invention provides a control apparatus for a belt-type CVT. The control apparatus includes: a brake operation determining unit that determines whether a brake of a vehicle is being operated; a vehicle speed determining unit that determines whether the vehicle speed is less than or equal to a predetermined reference speed; a clamping pressure control unit that controls the clamping pressure applied to the transmission belt, wherein the clamping pressure control unit increases the clamping pressure if the brake operation determining unit determines that the brake is being operated and the vehicle speed is less than or equal to the predetermined reference speed; and a clamping-pressure increase-rate reducing unit that reduces a rate of increase in the clamping pressure applied to the transmission belt if the vehicle speed falls to or below the predetermined reference speed when the brake operation determining unit determines that the brakes are being operated, wherein the clamping-pressure increase-rate is reduced to a lower increase-rate than when the speed of the vehicle does not falls to or below the predetermined reference speed. A control method for a CVT in accordance with the present invention includes the same conditions as the control apparatus for a CVT in accordance with the forth aspect of the present invention.

According to the fourth aspect, it is determined whether the brake of the vehicle is being operated and whether the vehicle speed is less than or equal to the predetermined reference speed. When it is determined that the brake is being operated and the vehicle speed is less than or equal to the predetermined reference speed, the clamping pressure applied to the transmission belt is increased. When the vehicle speed falls to or below the predetermined reference speed when it is determined that the brake is being operated, the rate of increase in the clamping pressure applied to the transmission belt is reduced to a lower increase-rate than when the speed of the vehicle does not falls to or below. Thus, when the vehicle speed falls to or below the predetermined reference value when the brake is being operated, the stepwise increase of the clamping pressure of the transmission belt is prohibited. Thus, an apparatus or a method for controlling a CVT such that a shock can be reduced is provided.

In a fifth aspect, the present invention provides a control apparatus for a belt-type CVT. The control apparatus includes: a brake operation determining unit that determines whether a brake of a vehicle is being operated; a vehicle speed determining unit that determines whether the vehicle speed is less than or equal to a predetermined reference speed; a clamping pressure control unit that controls the clamping pressure applied to the transmission belt, wherein the clamping pressure control unit increases the clamping pressure if the brake is being operated and the vehicle speed is less than or equal to the predetermined reference speed; and a clamping-pressure increase-amount setting unit that sets an amount of increase in the clamping pressure of the transmission belt to zero if the vehicle speed is higher than the predetermined reference speed, and sets the amount of increase in the clamping pressure applied to the transmission belt to a higher value as the vehicle speed decreases when the speed of the vehicle is less than or equal to the predetermined reference speed. A control method for a CVT in accordance with the present invention includes the same conditions as the control apparatus for a CVT in accordance with the fifth aspect of the present invention.

According to the fifth aspect, it is determined whether the brake of the vehicle is being operated and whether the vehicle speed is less than or equal to the predetermined reference speed. When it is determined that the brake is being operated and the vehicle speed is less than or equal to the predetermined reference speed, the clamping pressure applied to the transmission belt is increased. When the vehicle speed is higher than the predetermined reference speed, the amount of increase in the clamping pressure applied to the transmission belt is set to zero. However, if the vehicle speed is less than or equal to the predetermined reference speed, the amount of increase in the clamping pressure applied to the transmission belt is set to a higher value as the vehicle speed decreases. Thus, when the clamping pressure of the belt is increased, the amount of increase in the clamping pressure is reduced as the vehicle speed increases. Thus, when the vehicle speed falls to or below the predetermined reference speed, the stepwise increase of the clamping pressure applied to the transmission belt is prohibited. Thus, an apparatus or a method for controlling a CVT such that a transmission shock can be reduced is provided.

The program according to a sixth aspect of the present invention is a program executed on a computer to perform the control method for the CVT according to any one of the above-mentioned aspects. The recording medium according to a seventh aspect of the present invention is a computer-readable recording medium, which records therein the program that is executed on a computer to perform the control method for the CVT according to any one of the above-mentioned aspects.

According to the aspects, the control method for the CVT according to any one of the above-mentioned aspects can be performed using a computer (general-purpose computer or dedicated computer).

BRIEF DESCRIPTION OF THE DRAWINGS

The above and other features and advantages of the present invention will become apparent from the following description of example embodiments, given in conjunction with the accompanying drawings, in which.

DETAILED DESCRIPTION OF THE PREFERRED EMBODIMENTS

Figure 1:
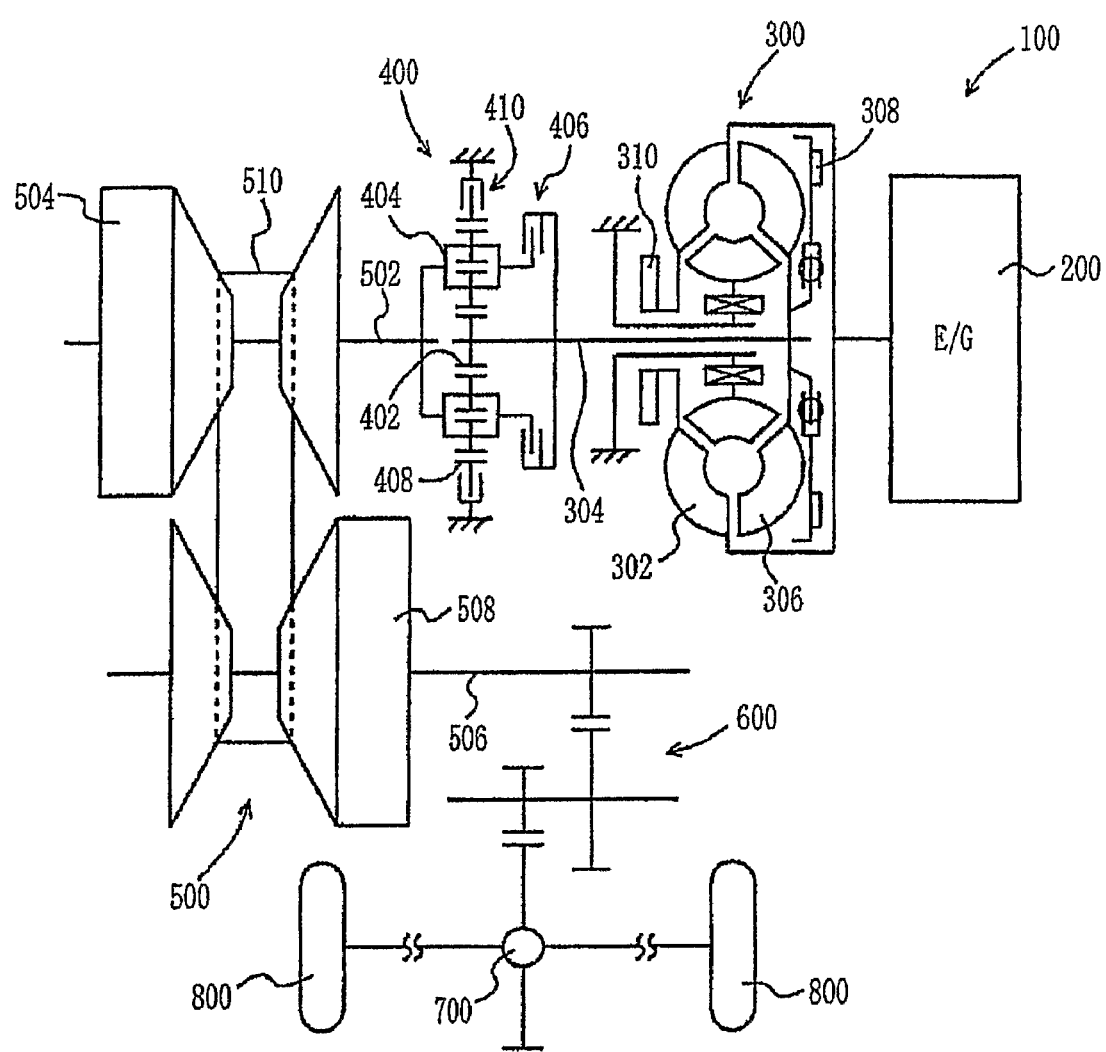
FIG. 1 is a schematic diagram of a vehicle equipped with an ECU used as a control apparatus according to a first embodiment of the present invention.

Example embodiments of the present invention will now be described in detail with reference to the accompanying drawings. In the following description, the same or like elements throughout the various embodiments of the present invention carry the same or like reference numerals. The same or like elements are given the same or like technical terms, and they execute the same or like functions. Thus, detailed explanations of the same or like elements are omitted for the sake of convenience.

A vehicle, equipped with a control apparatus according to the first embodiment of the present invention, will be described below with reference to FIG. 1. The output power of an engine 200, which is included in a drive unit 100 installed in the vehicle, is transmitted to a belt-type CVT 500 both through a torque converter 300 and a forward/reverse drive switching unit 400. The output power of the belt-type CVT 500 is transmitted both to a reduction gear 600 and to a differential gear unit 700, and is distributed to the left and right drive wheels 800. The drive unit 100 is controlled by an Electronic Control Unit (ECU) 900, which will be described in detail later herein. In the embodiment, the control apparatus for the CVT is operated under the control of the ECU 900, which executes a program stored in a Read Only Memory (ROM) 930 of the ECU 900.

The torque converter 300 comprises a pump blade 302, which is connected to the crankshaft of the engine 200, and a turbine blade 306, which is connected to the forward/reverse drive switching unit 400 through a turbine shaft 304. A lockup clutch 308 is provided between the pump blade 302 and the turbine blade 306. The lockup clutch 308 is engaged or disengaged by changing the supply of hydraulic pressure to an engaging oil chamber or to a disengaging oil chamber.

When the lockup clutch 308 is completely engaged, both the pump blade 302 and the turbine blade 306 are rotated. The pump blade 302 is provided with a mechanical oil pump 310, which produces hydraulic pressure for controlling the transmission of the belt-type CVT 500, generating the clamping pressure of the belt, and supplying lubricant to desired parts of the CVT.

The forward/backward drive switching unit 400 comprises a double pinion type planetary gear mechanism. In the forward/backward drive switching unit 400, the turbine shaft 304 of the torque converter 300 is connected to a sun gear 402. The input shaft 502 of the belt-type CVT 500 is connected to a gear carrier 404. The gear carrier 404 and the sun gear 402 are connected to each other through a forward clutch 406. The ring gear 408 is fixed to a housing through a reverse brake 410. The forward clutch 406 and the reverse brake 410 are frictionally engaged with each other by the operation of a hydraulic cylinder. The input rpm of the forward clutch 406 is equal to the rpm of the turbine shaft 304, which is called "the turbine rpm NT".

When the forward clutch 406 is engaged and the reverse brake 410 is disengaged, the forward/reverse drive switching unit 400 is brought into an engagement state for executing a forward drive mode. In the above state, forward drive force is transmitted to the belt-type CVT 500. Meanwhile, when the reverse brake 410 is engaged and the forward clutch 406 is disengaged, the forward/reverse drive switching unit 400 is brought into an engagement state for executing a reverse drive mode. In the above state, the input shaft 502 is rotated in the opposite direction relative to the turbine shaft 304. Thus, reverse drive force is transmitted to the belt-type CVT 500. When both the forward clutch 406 and the reverse brake 410 are disengaged, the forward/reverse drive switching unit 400 is brought into a neutral state, in which the CVT does not transmit power.

The belt-type CVT 500 comprises a primary pulley 504 provided on the input shaft 502, a secondary pulley 508 provided on the output shaft 506, and a transmission belt 510 clamping the primary and secondary pulleys 504 and 508. The belt-type CVT 500 can execute power transmission due to frictional contact between the transmission belt 510 and the two pulleys 504 and 508.

The pulleys 504 and 508 comprise respective hydraulic cylinders for varying the groove widths of the pulleys. The groove widths of the pulleys 504 and 508 can be changed by controlling the hydraulic pressure applied to the hydraulic cylinder of the primary pulley 504. Thus, the wrapping diameters of the transmission belt 510, which is wrapped around the primary and secondary pulleys 504 and 508, change, so that the transmission ratio GR (=primary pulley rpm $N_{IN}$/secondary pulley rpm $N_{OUT}$) can be continuously changed.

Figure 2:
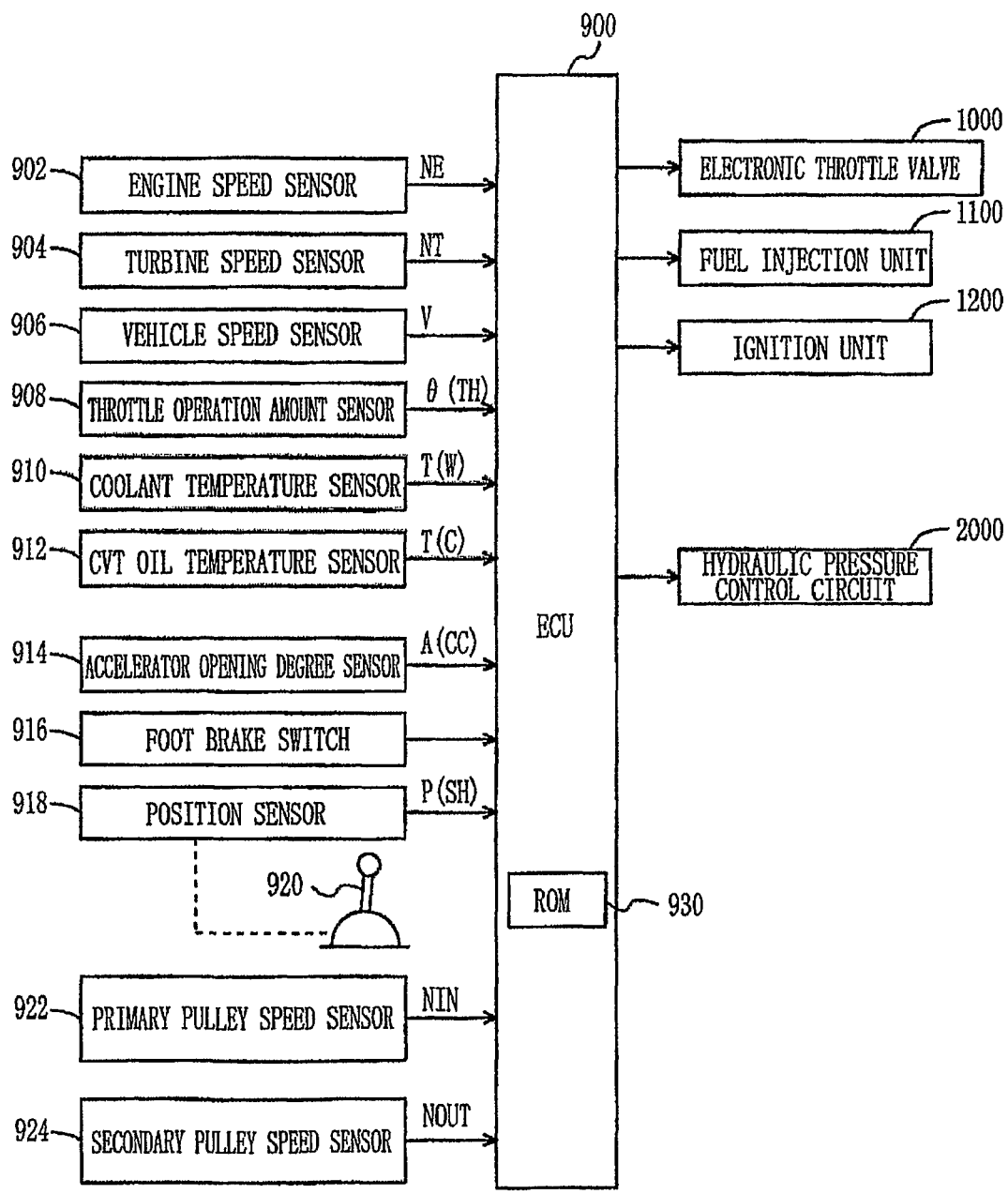
FIG. 2 is a block diagram illustrating the configuration of the ECU used as the control apparatus according to the first embodiment of the present invention.

As shown in FIG. 2, the ECU 900 is connected to an engine speed sensor 902, a turbine speed sensor 904, a vehicle speed sensor 906, a throttle opening degree sensor 908, a coolant temperature sensor 910, an oil temperature sensor 912, an accelerator operation amount sensor 914, a foot brake switch 916, a position sensor 918, a primary pulley speed sensor 922 and a secondary pulley speed sensor 924.

The engine speed sensor 902 detects the rotational speed NE of the engine 200, while the turbine speed sensor 904 detects the rotational speed NT of the turbine shaft 304. The vehicle speed sensor 906 detects the speed V of the vehicle. The throttle opening degree sensor 908 detects the opening degree θ(TH) of an electronic throttle valve. The coolant temperature sensor 910 detects the coolant temperature T(W) of the engine 200. The oil temperature sensor 912 detects the oil temperature T(C) of the belt-type CVT 500. The accelerator operation amount sensor 914 detects the operation amount A(CC) of an accelerator pedal. The foot brake switch 916 detects the operation of a foot brake. If the brake pedal is operated, the foot brake switch 916 is turned on (ON). However, when the brake pedal is not operated, the foot brake switch 916 is turned off (OFF).

The position sensor 918 determines whether a contact point, which is provided at a location corresponding to a shifted position, is turned on or off, so that the position sensor 918 detects the position P (SH) of a shift lever 920. The primary pulley speed sensor 922 detects the rotational speed $N_{IN}$ of the primary pulley 504. The secondary speed sensor 924 detects the rotational speed $N_{OUT}$ of the secondary pulley 508. The signals indicating the detected results are transmitted from the respective sensors to the ECU 900. In the above state, the turbine speed NT is equal to the primary pulley speed $N_{IN}$ during the forward drive mode, wherein the forward clutch 406 is engaged. Further, the vehicle speed V corresponds to the secondary speed $N_{OUT}$. Thus, when the vehicle is stopped and the forward clutch 406 is engaged, the turbine speed NT is zero.

The ECU 900 comprises a CPU (Central Processing Unit), a memory and an input/output interface. The CPU processes signals according to a program stored in the memory, Thus, the CPU executes output power control for the engine 200, transmission control for the belt-type CVT 500, camping pressure control for the belt, engagement/disengagement control for the forward clutch 406, and engagement/disengagement control for the reverse brake 410.

The output power control for the engine 200 is executed by an electronic throttle valve 1000, a fuel injection unit 1100, and an ignition unit 1200. The transmission control for the belt-type CVT 500, the clamping pressure control for the belt, the engagement/disengagement control for the forward clutch 406 and the engagement/disengagement control for the reverse brake 410 are executed by a hydraulic pressure control circuit 2000.

Below, part of the hydraulic pressure control circuit 2000 will be described with reference to FIG. 3. The hydraulic pressure, which is generated by the oil pump 310, is applied to a primary regulator valve 2100, a first modulator valve 2310 and a third modulator valve 2330 through a line pressure hydraulic path 2002.

In the above state, control pressure is applied from one of an SLT linear solenoid valve 2200 or an SLS linear solenoid valve 2210 to the primary regulator valve 2100. In the embodiment, each of the SLT linear solenoid valve 2200 and SLS linear solenoid valve 2210 may be selected from normal open type solenoid valves, which output the maximum hydraulic pressure when no current is applied to the solenoid valves. Alternatively, each of the SLT linear solenoid valve 2200 and the SLS linear solenoid valve 2210 may be selected from normal closed type solenoid valves, which output the minimum hydraulic pressure (zero value) when no current is applied to the solenoid valves.

The spool of the primary regulator valve 2100 slides upwards and downwards due to the control pressure applied thereto. Thus, the hydraulic pressure generated by the oil pump 310 is regulated by the primary regulator valve 2100. The hydraulic pressure, regulated by the primary regulator valve 2100, may be used as the line pressure PL. In the embodiment, the line pressure PL is increased as the control pressure applied to the primary regulator valve 2100 increases. However, it should be understood that the control apparatus may be configured such that the line pressure PL is reduced as the control pressure applied to the primary regulator valve 2100 increases.

Hydraulic pressure, which is regulated from the line pressure PL as the source pressure by the third modulator valve 2330, is applied both to the SLT linear solenoid valve 2200 and to the SLS linear solenoid valve 2210.

Both the SLT linear solenoid valve 2200 and the SLS linear solenoid valve 2210 generate control pressure according to an electric current value, which is determined by a duty signal output from the ECU 900.

The control pressure to be applied to the primary regulator valve 2100 is selected by a control valve 2400 from the control pressure (output hydraulic pressure) of the SLT linear solenoid valve 2200 and the control pressure (output hydraulic pressure) of the SLS linear solenoid valve 2210.

Figure 3:
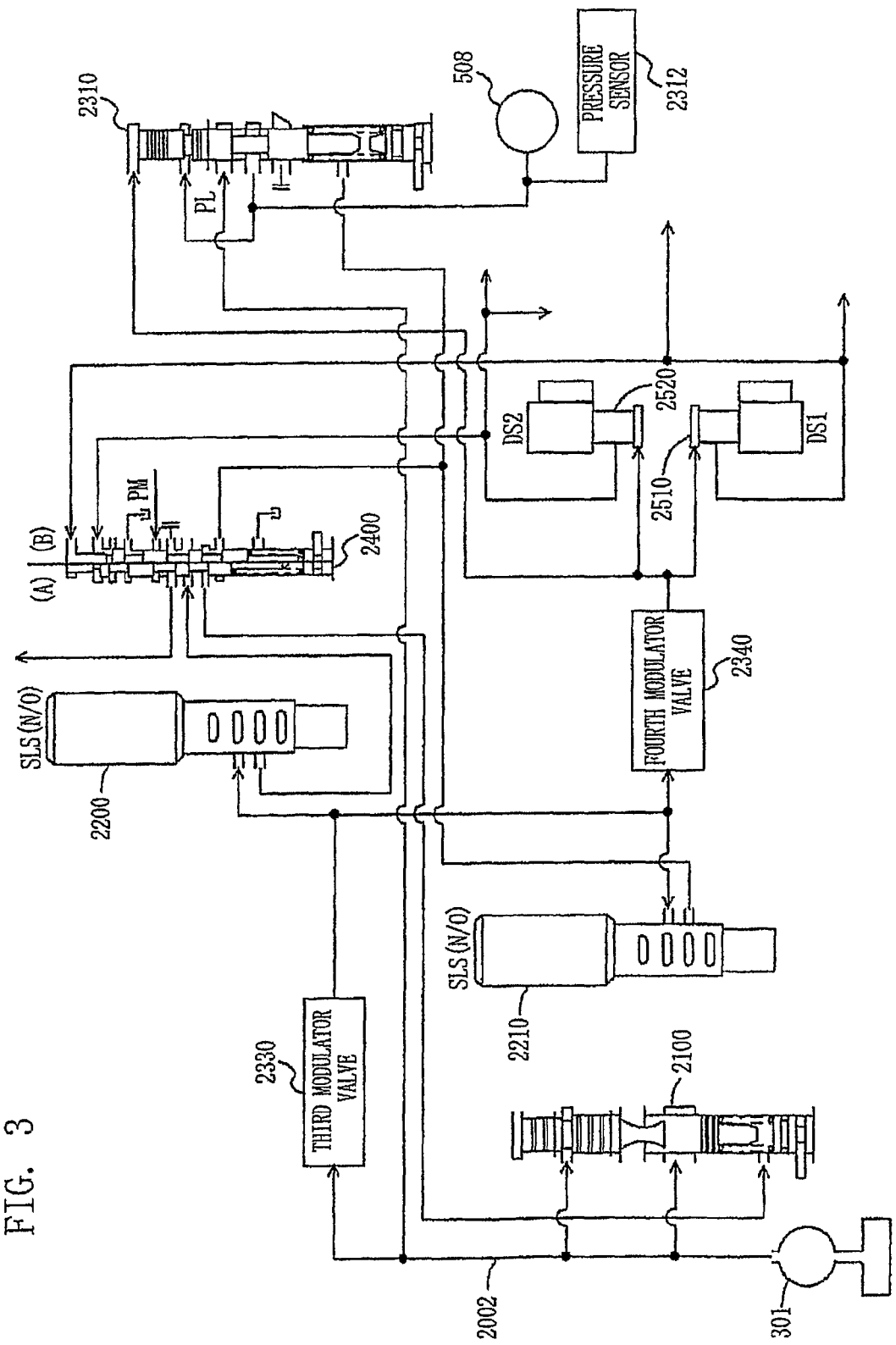
FIG. 3 is a circuit diagram illustrating a first example of a hydraulic pressure control circuit according to the present invention (a first example)

When the spool of the control valve 2400 is in the 'A' state in FIG. 3, control pressure is applied from the SLT linear solenoid valve 2200 to the primary regulator valve 2100. The line pressure PL is controlled by the control pressure of the SLT linear solenoid valve 2200.

However, when the spool of the control valve 2400 is in the 'B' state in FIG. 3, the control pressure is applied from the SLS linear solenoid valve 2210 to the primary regulator valve 2100. In other words, the line pressure PL is controlled by the control pressure of the SLS linear solenoid valve 2210.

Further, when the spool of the control valve 2400 is in the 'B' state in FIG. 3, the control pressure of the SLT linear solenoid valve 2200 is applied to a manual valve 2600, which will be described later herein.

The spool of the control valve 2400 is biased in one direction by a spring. Hydraulic pressure is applied from both a first transmission control duty solenoid 2510 and a second transmission control duty solenoid 2520 to the control valve 2400 in the direction opposite the biasing direction of the spring.

When the hydraulic pressure is applied to the control valve 2400 from both the first transmission control duty solenoid 2510 and the second transmission control duty solenoid 2520, the spool of the control valve 2400 enters the 'B' state in FIG. 3.

If no hydraulic pressure is applied to the control valve 2400 from at least one of the first transmission control duty solenoid 2510 or the second transmission control duty solenoid 2520, the spool of the control valve 2400 enters the 'A' state in FIG. 3 due to the biasing force of the spring.

Hydraulic pressure, regulated by a fourth modulator valve 2340, is applied both to the first transmission control duty solenoid 2510 and to the second transmission control duty solenoid 2520. The fourth modulator valve 2340 regulates the hydraulic pressure applied from the third modulator valve 2330, thus making the pressure constant.

The first modulator valve 2310 outputs hydraulic pressure, which is regulated from the line pressure PL as the source pressure. The hydraulic pressure, output from the first modulator valve 2310, is applied to the hydraulic cylinder of the secondary pulley 508. Because the hydraulic pressure is applied to the hydraulic cylinder of the secondary pulley 508, the transmission belt 510 can be prevented from slipping on the pulleys 504 and 508.

The first modulator valve 2310 comprises an axially movable spool and a spring, which biases the spool in one direction. The first modulator valve 2310 regulates the line pressure PL, introduced thereto, using pilot pressure, which is the output hydraulic pressure of the SLS linear solenoid valve 2210. In the above state, the SLS linear solenoid valve 2210 is duty controlled by the ECU 900. The hydraulic pressure, regulated by the first modulator valve 2310, is applied to the hydraulic cylinder of the secondary pulley 508. The clamping pressure of the belt is increased or decreased by the output hydraulic pressure of the first modulator valve 2310.

The SLS linear solenoid valve 2210 is controlled according to a map using both an accelerator operating amount (ACC) and a transmission ratio GR as parameters, thus providing appropriate clamping pressure capable of preventing slippage of the transmission belt on the pulleys. Described in detail, the excitation current for the SLS linear solenoid valve 2210 is controlled at a duty ratio in accordance with the clamping pressure of the belt. In the embodiment, when the transmission torque suddenly varies during acceleration or deceleration of a vehicle, the clamping pressure of the belt is increased to prevent slippage of the transmission belt on the pulleys.

The hydraulic pressure, applied to the hydraulic cylinder of the secondary pulley 508, is detected by a pressure sensor 2312.

Below, the manual valve 2600 will be described with reference to FIG. 4. The manual valve 2600 is mechanically controlled in response to operation of the shift lever 920. The forward clutch 406 and the reverse brake 410 may be engaged or disengaged in accordance with the operation of the manual valve 2600.

The shift lever 920 is shifted between a P position for a parking mode, an R position for a reverse driving mode, an N position for a neutral mode, in which power transmission is cut, and a D position and a B position for forward driving modes.

At each of the P position and the N position, hydraulic pressure both in the forward clutch 406 and in the reverse brake 410 is drained from the manual valve 2600. Thus, the forward clutch 406 and the reverse brake 410 are in disengaged states.

At the R position, hydraulic pressure is applied from the manual valve 2600 to the reverse brake 410. Thus, the reverse brake 410 is engaged. Further, in the above state, hydraulic pressure in the forward clutch 406 is drained from the manual valve 2600. Thus, the forward clutch 406 is released.

Figure 4:
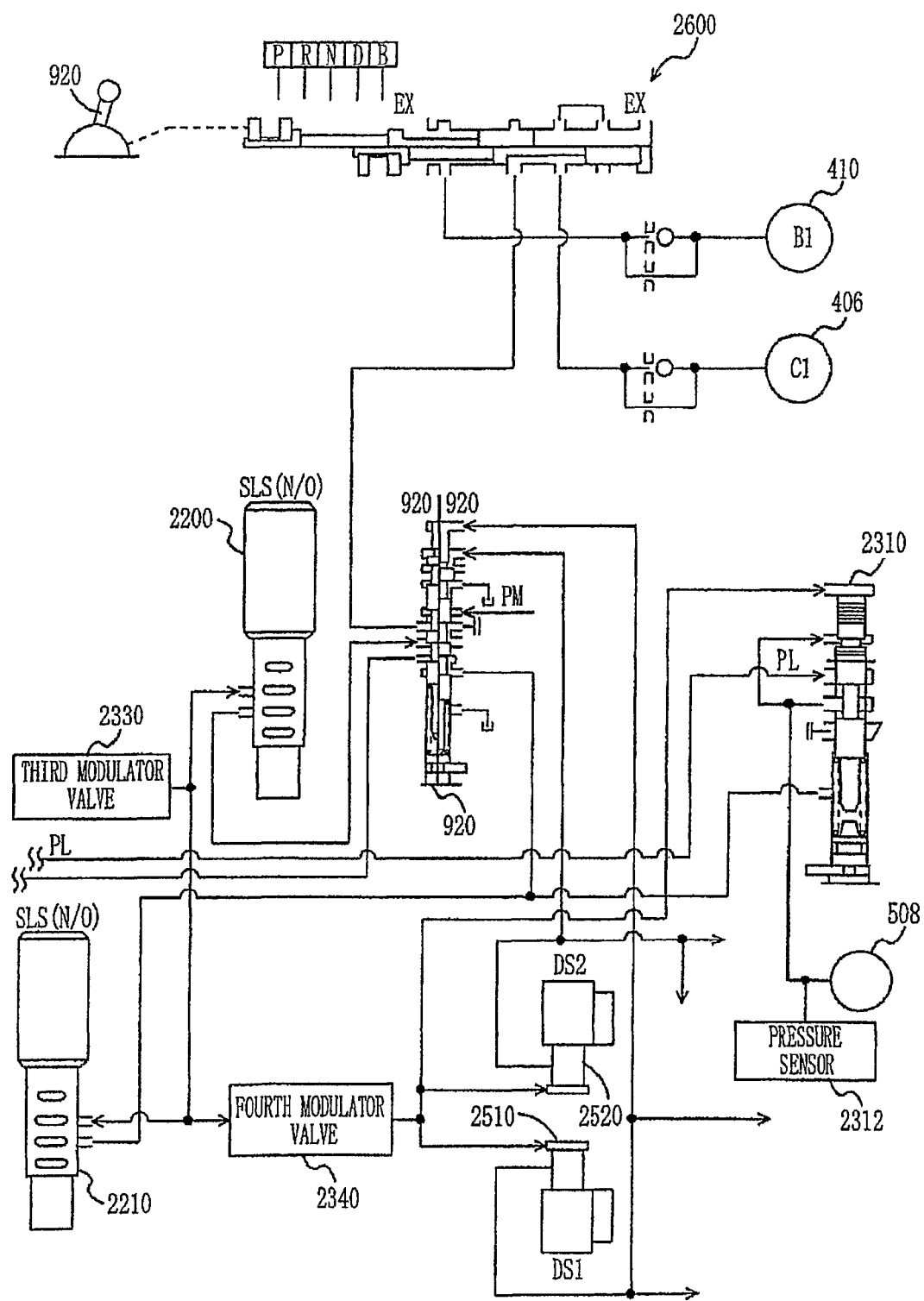
FIG. 4 is a circuit diagram illustrating a second example of the hydraulic pressure control circuit according to the present invention (a second example)

When the control valve 2400 is in the A state in FIG. 4 (left-handed state), modulator pressure PM, applied from a second modulator valve (not shown), is applied to the manual valve 2600 through the control valve 2400. Due to the modulator pressure PM, the reverse brake 410 is maintained in an engaged state.

When the control valve 2400 is in the B state in FIG. 4 (right-handed state), the hydraulic pressure, regulated by the SLT linear solenoid valve 2200, is applied to the manual valve 2600. Because the hydraulic pressure is regulated by the SLT linear solenoid valve 2200, the reverse brake 410 is smoothly engaged, thus preventing the generation of shocks during engagement.

At the D position or the B position, hydraulic pressure is applied from the manual valve 2600 to the forward clutch 406. Thus, the forward clutch 406 is engaged. Further, in the above state, the hydraulic pressure in the reverse brake 410 is drained from the manual valve 2600, so that the reverse brake 410 is released.

When the control valve 2400 is in the A state in FIG. 4 (left-handed state), the modulator pressure PM from the second modulator valve (not shown) is applied to the manual valve 2600 through the control valve 2400. The modulator pressure PM maintains the forward clutch 406 in an engaged state.

When the control valve 2400 is in the B state in FIG. 4 (right-handed state), the hydraulic pressure regulated by the SLT linear solenoid valve 2200 is applied to the manual valve 2600. Because the hydraulic pressure is regulated by the SLT linear solenoid valve 2200, the forward clutch 406 is smoothly engaged and prevents the generation of shocks during engagement.

The SLT linear solenoid valve 2200 controls the line pressure PL through the control valve 2400. Further, the SLS linear solenoid valve 2210 controls the clamping pressure of the belt through the first modulator valve 2310.

Meanwhile, when a neutral control execution condition for stopping the vehicle is achieved and the speed of the vehicle becomes zero when the shift lever 920 is in the D position, the SLT linear solenoid valve 2200 controls the engagement force of the forward clutch 406 to reduce the engagement force of the forward clutch 406. The SLS linear solenoid valve 2210 controls the clamping pressure of the belt through the first modulator valve 2310 and controls the line pressure PL on behalf of the SLT linear solenoid valve 2200.

When a garage shift, wherein the shift lever 920 is shifted from the N position to the D position or to the R position, is executed, the SLT linear solenoid valve 2200 controls the engagement force of the forward clutch 406 or the engagement force of the reverse brake 410 such that the forward clutch 406 or the reverse brake 410 is smoothly engaged. In the above state, the SLS linear solenoid valve 2210 controls the clamping pressure of the belt through the first modulator valve 2310 and controls the line pressure PL on behalf of the SLT linear solenoid valve 2200.

Next, the construction for executing transmission control will be described in detail with reference to FIG. 5. The transmission control is executed by controlling the application and release of hydraulic pressure to and from the hydraulic cylinder of the primary pulley 504. The supply and discharge of actuation oil relative to the hydraulic cylinder of the primary pulley 504 is controlled both by a first ratio control valve 2710 and by a second ratio control valve 2720.

Both the first ratio control valve 2710 and the second ratio control valve 2720 communicate with the hydraulic cylinder of the primary pulley 504. The first ratio control valve 2710 supplies the line pressure PL to the hydraulic cylinder, while the second ratio control valve 2720 is connected to the drain unit.

The first ratio control valve 2710 is a valve for executing an upshift mode. The first ratio control valve 2710 comprises a spool, which controls the hydraulic path between an inlet port for introducing the line pressure PL into the valve 2710, and an outlet port, which is connected to the hydraulic cylinder of the primary pulley 504.

A spring is placed in one end of the spool of the first ratio control valve 2710. A control pressure inlet port is provided on the other end of the spool, opposite the spring, so that the control pressure from the first transmission control duty solenoid 2510 is fed to the valve 2710. Further, another control pressure inlet port is provided on the end of the spool having the spring so that the control pressure from the second transmission control duty solenoid 2520 is fed to the valve 2710.

Figure 5:
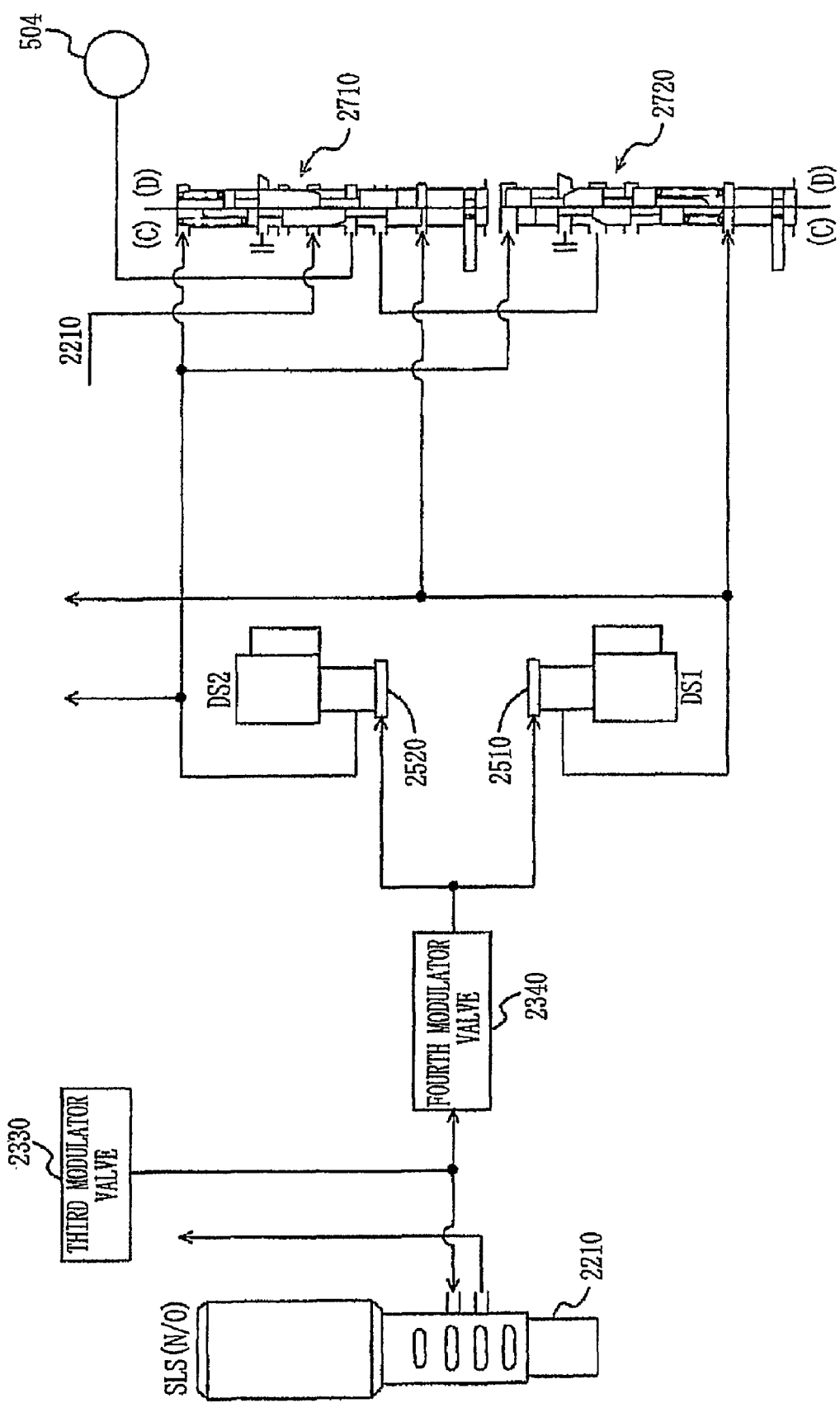
FIG. 5 is a circuit diagram illustrating a third example of the hydraulic pressure control circuit according to the present invention (a third example)

When both the first and second transmission control duty solenoids 2510 and 2520 are controlled such that the first transmission control duty solenoid 2510 outputs high control pressure and the second transmission control duty solenoid 2520 outputs zero control pressure, the spool of the first ratio control valve 2710 achieves the D state in FIG. 5 (right-handed state).

In the above state, the hydraulic pressure applied to the hydraulic cylinder of the primary pulley 504 is increased, thereby reducing the groove width of the primary pulley 504. Therefore, the transmission ratio becomes reduced. This means that an upshift mode is executed. Further, the shift speed in the above state can be increased by increasing the flow rate of the inlet actuation oil.

The second ratio control valve 2720 is a valve for executing a downshift mode. A spring is placed in one end of the spool of the second ratio control valve 2720. A control pressure inlet port is provided on the other end of the spool opposite the spring, so that the control pressure from the first transmission control duty solenoid 2510 is fed to the valve 2720. Further, another control pressure inlet port is provided on the end of the spool having the spring, so that the control pressure from the second transmission control duty solenoid 2520 is fed to the valve 2720.

When both the first and second transmission control duty solenoids 2510 and 2520 are controlled such that the second transmission control duty solenoid 2520 outputs high control pressure and the first transmission control duty solenoid 2510 outputs zero control pressure, the spools of the second control valve 2720 achieves the C state in FIG. 5 (left-handed state). Then, the spool of the first control valve 2710 also achieves the C state in FIG. 5 (left-handed state).

In the above state, actuation oil is drained from the hydraulic cylinder of the primary pulley 504 through both the first ratio control valve 2710 and the second ratio control valve 2720. Thus, the groove width of the primary pulley 504 is increased, and thus the transmission ratio is increased. This means that a downshift mode is executed. Further, the shift speed in the above state may be increased by increasing the flow rate of the outlet actuation oil.

Figure 6:
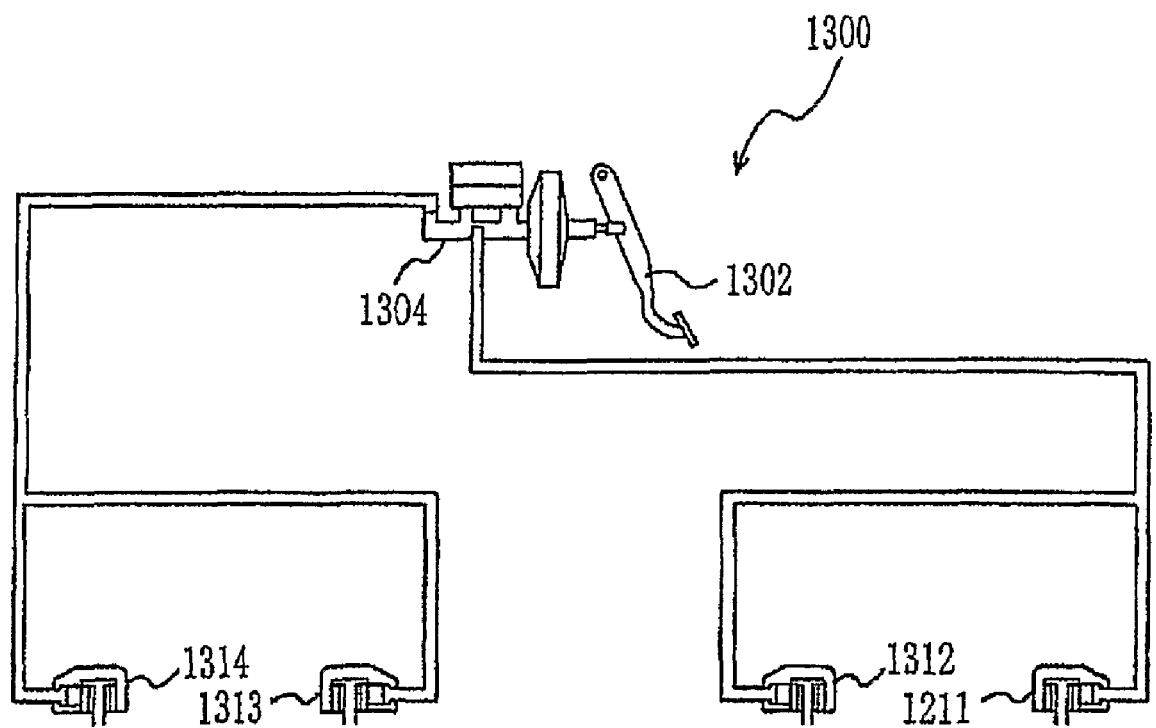
FIG. 6 is a view schematically illustrating a brake system according to the present invention.

Next, a brake system 1300, which brakes the vehicle, will be described in detail with reference to FIG. 6. A brake pedal 1302 is connected to a master cylinder 1304. When the brake pedal 1302 is being operated, hydraulic pressure in accordance with the brake operation value is generated in the master cylinder 1304.

The hydraulic pressure, generated in the master cylinder 1304, is applied to calipers 1311•1314. Due to the hydraulic pressure applied to the calipers 1311•1314, a braking operation is executed. In the present invention, the calipers may be electrically operated calipers instead of hydraulically operated calipers.

Figure 7:
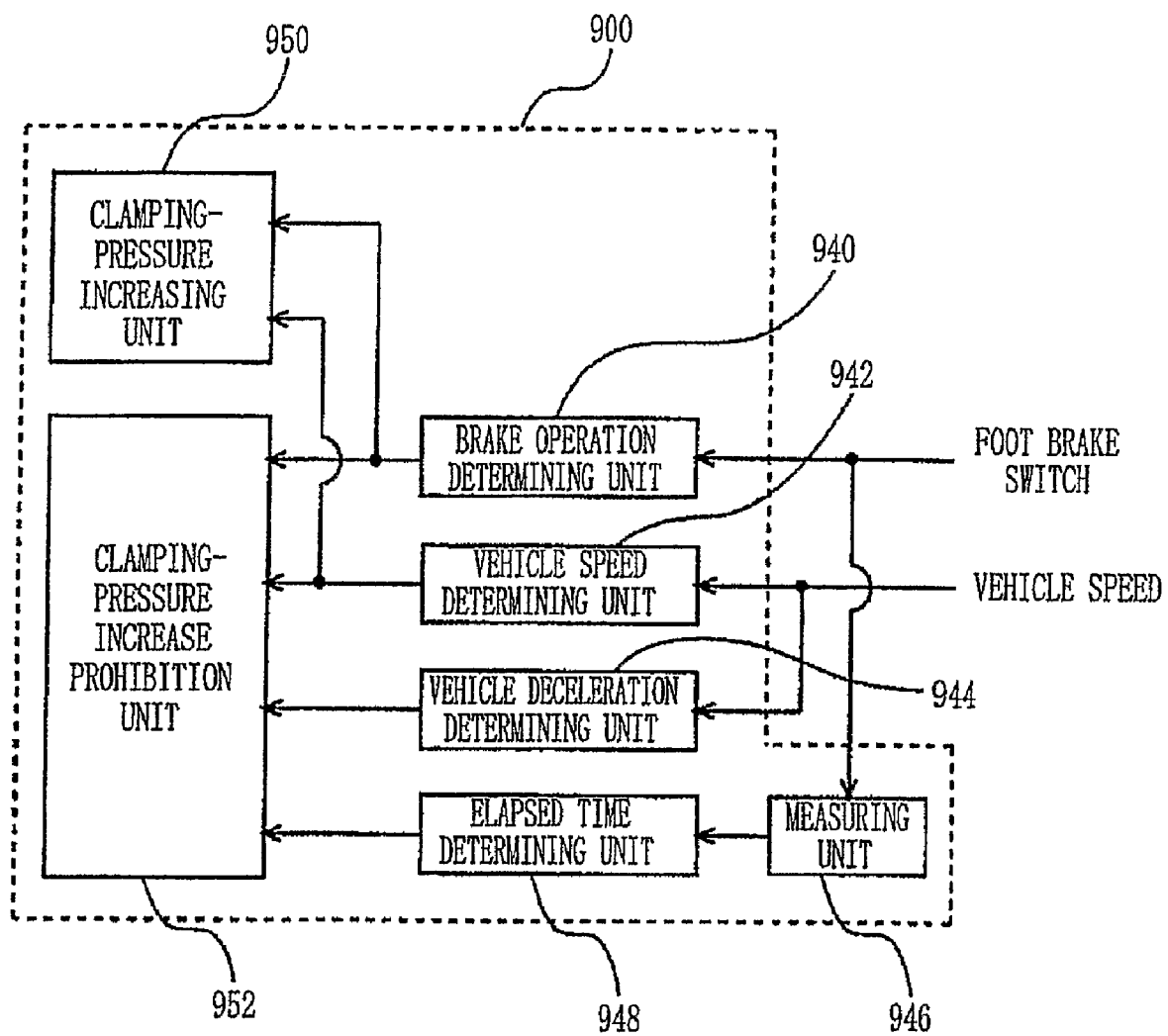
FIG. 7 is a block diagram illustrating the function of the ECU used as the control apparatus according to the first embodiment of the present invention.

Next, the function of the ECU 900 used as the control apparatus according to the embodiment will be described in detail with reference to FIG. 7. In the present invention, the function, which will be described in the following description, may be executed using either hardware or software.

The ECU 900 comprises a brake operation determining unit 940, a vehicle speed determining unit 942, a vehicle deceleration determining unit 944, a measuring unit 946, an elapsed time determining unit 948, a clamping-pressure increasing unit 950, and a clamping-pressure increase prohibition unit 952.

The brake operation determining unit 940 determines whether a foot brake switch 916 is turned on or off. In other words, the brake operation determining unit 940 determines whether the brake is being operated. The vehicle speed determining unit 942 determines whether the vehicle speed is less than or equal to a threshold speed V(0).

The deceleration determining unit 944 determines whether the deceleration, obtained through the differentiation of the vehicle speed, is less than or equal to a threshold deceleration DV(0). In the embodiment, the deceleration is calculated as a positive value.

The measuring unit 946 always counts the time and resets the counted time to zero when the foot brake switch 916 is turned off, so that the measuring unit 946 can count the elapsed time after the foot brake switch 916 is turned on (i.e., after the operation of the brake). The elapsed time determining unit 948 determines whether time elapsed since the operation of the brake is greater than or equal to a threshold time T(0).

When the brake operation determining unit 940 determines that the brake is being operated and the vehicle speed determining unit 942 determines that the vehicle speed is less than or equal to the threshold speed V(0), the clamping-pressure increasing unit 950 controls the SLS linear solenoid valve 2210 to stepwisely increase the clamping pressure of the belt to a pressure level P(ON) higher than a normal pressure P(OFF) when the brake is not being operated and the foot brake switch 916 is turned off.

If the vehicle speed to or below the threshold speed V(0), the vehicle deceleration is less than or equal to the threshold deceleration DV(0), and the time passed after the operation of the brake is greater than or equal to the threshold time T(0) when the brake operation determining unit 940 determines that the brake is being operated, the clamping-pressure increase prohibition unit 952 prohibits an increase in the clamping pressure of the belt.

Figure 8:
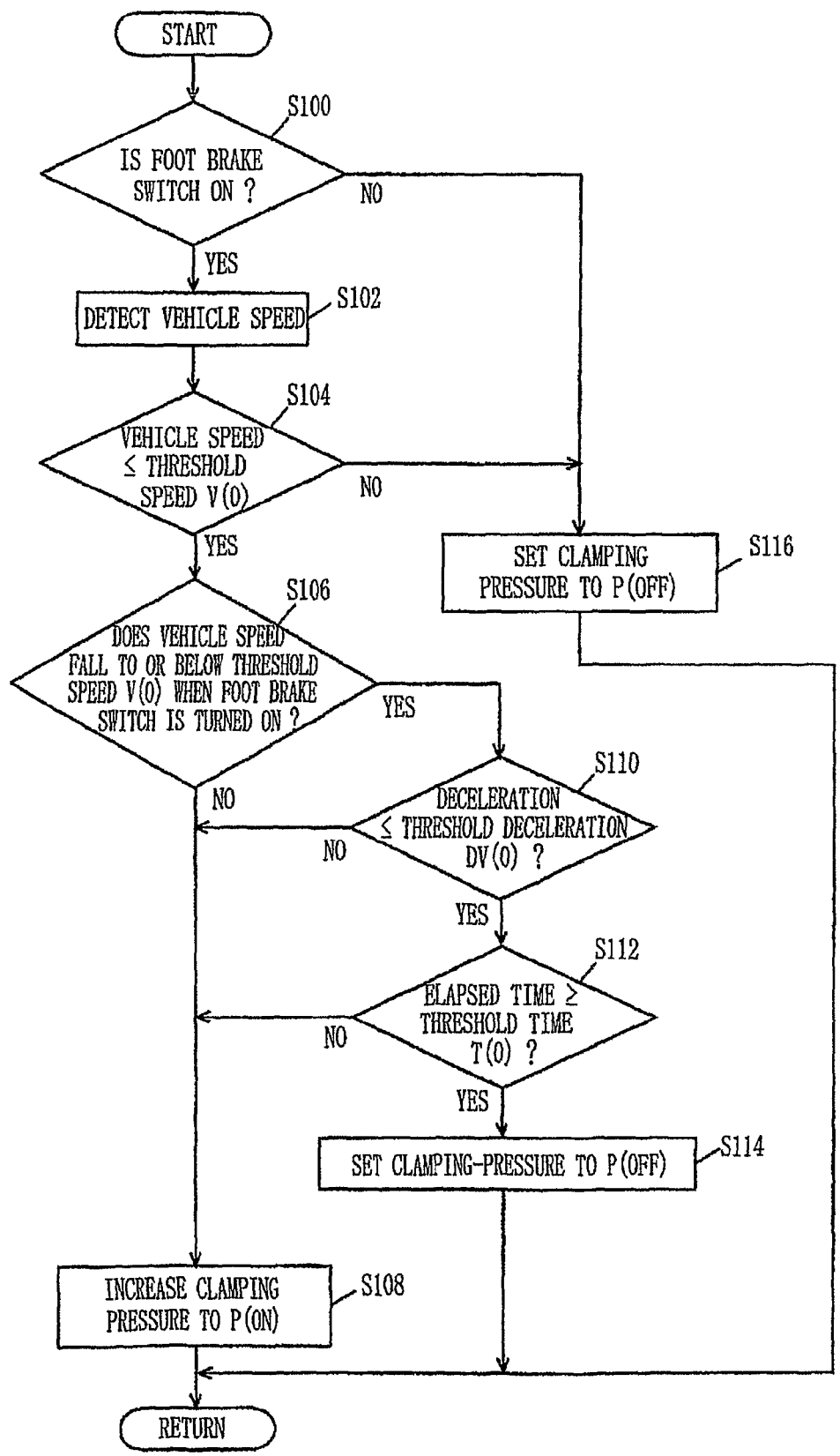
FIG. 8 is a flowchart of a control structure of a program executed by the ECU used as the control apparatus according to the first embodiment of the present invention.

Next, the control structure of a program executed by the ECU 900 used as the control apparatus according to the embodiment of the present invention will be described with reference to FIG. 8. In the embodiment, the program is periodically executed at predetermined intervals.

At step 100 (hereinafter, the step is referred to simply as 'S'), ECU 900 determines whether the foot brake switch 916 has been turned on or off (i.e., whether the brake has been operated) in response to a signal output from the foot brake switch 916. If it is determined that the foot brake switch 916 has been turned on (i.e., YES at S100), the routine proceeds to S102. However, when it is determined that the foot brake switch 916 has been turned off (i.e., NO at S100), the routine proceeds to S116.

At S102, the ECU 900 detects the vehicle speed in response to a signal output from the vehicle speed sensor 906. At S104, the ECU 900 determines whether the vehicle speed is less than or equal to the threshold speed V(0). When it is determined that the vehicle speed is less than or equal to the threshold speed V(0) (i.e., YES at S104), the routine proceeds to S106. However, when the opposite answer is obtained (i.e., NO at S104), the routine proceeds to S116.

At S106, the ECU 900 determines whether the vehicle speed falls to or below the threshold speed V(0) (i.e. changes from a higher value than the threshold speed V(0) to a lower value than the threshold speed V(0)) when it is determined that the foot brake switch 916 has been turned on. If it is determined that the vehicle speed has fallen to or below the threshold speed V(O) and it is determined that the foot brake switch 916 has been turned on (i.e., YES S106), the routine proceeds to S110. However, when the opposite answer is obtained (i.e., NO at S106), the routine proceeds to S108.

At S108, the ECU 900 increases the clamping pressure of the belt to a pressure level P(ON) that is higher than the normal pressure P(OFF) when the foot brake switch 916 is turned off.

At S110, the ECU 900 determines whether the deceleration of the vehicle is less than or equal to the threshold deceleration DV(0). When it is determined that the deceleration of the vehicle is less than or equal to the threshold deceleration DV(0) (i.e., YES at S110), the routine proceeds to S112. However, when the opposite answer is obtained (i.e., NO at S110), the routine proceeds to S108.

At S112, the ECU 900 determines whether the time passed after the operation of the brake is greater than or equal to the threshold time T(0). When it is determined that the time passed after the operation of the brake is greater than or equal to the threshold time T(0) (i.e., YES at S112), the routine proceeds to S114. However, when the opposite answer is obtained (i.e., NO at S112), the routine proceeds to S108.

At S114, the ECU 900 prohibits an increase in the clamping pressure of the belt. At S116, the ECU 900 sets the clamping pressure of the belt to the normal pressure P(OFF) when the foot brake switch 916 is turned off.

Next, the operation of the ECU 900 used as the control apparatus according to the embodiment of the present invention will be described based on the above-mentioned configuration and flowchart.

While the vehicle is driven, the ECU 900 determines whether the foot brake switch 916 has been turned on or off, based on a signal output from the foot brake switch 916 (S100). If it is determined that the foot brake switch 916 has been turned off (i.e., NO at S100), in other words, when a driver does not have the intention to stop the vehicle and does not operate the foot brake, the clamping pressure of the belt is set to the normal pressure P(OFF) when the foot brake switch 916 is turned off (S116).

When the foot brake switch 916 is turned on (i.e., YES at S100), the vehicle speed is detected based on a signal output from the vehicle speed sensor 906 (S102). If the vehicle speed is higher than the threshold speed V(0) (i.e., NO at S104), the torque acting on the transmission belt 510 is not excessively high even though the vehicle is being braked. Thus, in the above state, the clamping pressure of the belt is set to the normal pressure P(OFF) when the foot brake switch 916 is turned off (S116).

If the vehicle speed is less than or equal to the threshold speed V(0) (i.e., YES at S104), the torque acting on the transmission belt 510 may be excessively increased if a quick braking operation is executed. When the torque acting on the transmission belt 510 is excessively increased in such a way, the transmission belt 510 may slip on the pulleys.

Thus, when the vehicle speed does not fall to or below the threshold speed V(O) when the foot brake switch 916 has been turned on (i.e., NO at S106), the clamping pressure of the belt is increased to the pressure level P(ON), which is higher than the normal pressure P(OFF), which is set when the foot brake switch 916 is turned off (S108). In other words, when the brake is being operated such that the foot brake switch 916 is changed from OFF to ON and the vehicle speed is equal to or lower than the threshold speed V(0), the clamping pressure of the belt is increased. Thus, the slippage of the transmission belt 510 on the pulleys is reduced.

If the vehicle speed falls to or below the threshold speed V(0) when the foot brake switch 916 is turned on, in other words, when the brake is being operated (i.e., YES at S106), and the clamping pressure of the belt is increased, it may cause a shock after the brake operation timing. Such a shock may cause the driver some discomfort.

In the above state, when the deceleration of the vehicle is less than or equal to the threshold deceleration DV(0) (i.e., YES at S110), and the elapsed time since the operation of the brake began is greater than or equal to the threshold time T(O) (i.e., YES at S112), an increase in the clamping pressure of the belt is prohibited (S114). In other words, when the deceleration of the vehicle is low and the brake is operated for a lengthy period of time and the brake is thus recognized as being smoothly operated, increases in the clamping pressure of the belt is prohibited, and thereby shocks are reduced.

Meanwhile, when the deceleration of the vehicle is higher than the threshold deceleration DV(0) (i.e., NO at S110), the brake is thus recognized as being a quick braking operation. Further, if the elapsed time since the operation of the brake began is less than the threshold time T(0) (i.e., NO at S112), the vehicle may not be undergoing a smooth braking operation, but may be undergoing a quick braking operation. In both cases, the torque acting on the transmission belt 510 may be excessively increased.

Thus, when the deceleration of the vehicle is higher than the threshold deceleration DV(0) (i.e., NO at S110) or when the elapsed time after the operation of the brake is less than the threshold time T(0) (i.e., NO at S112), the clamping pressure of the belt is increased to the pressure level P(ON), which is higher than the normal pressure P(OFF) (S108). Thus, the slippage of the transmission belt 510 on the pulleys can be reduced.

As described above, the ECU used as the control apparatus according to the embodiment determines whether the brake is being operated. Thereafter, when it is determined that the speed of the vehicle is less than or equal to the threshold speed V(0), the clamping pressure applied to the transmission belt is increased. When the vehicle speed falls to or below the threshold speed V(0) when it is determined that the brake is being operated, an increase in the clamping pressure of the belt is prevented. Thus, the control apparatus reduces shock, which may be induced by the braking operation.

Next, the second embodiment of the present invention will be described. Unlike the first embodiment, in which an increase in the clamping pressure of the belt is prohibited, the second embodiment reduces the rate of increase of the clamping pressure of the belt. In the second embodiment, the general configuration and general function of the control apparatus remain the same as in the first embodiment and further explanation of the same elements is thus not repeated.

Figure 9:
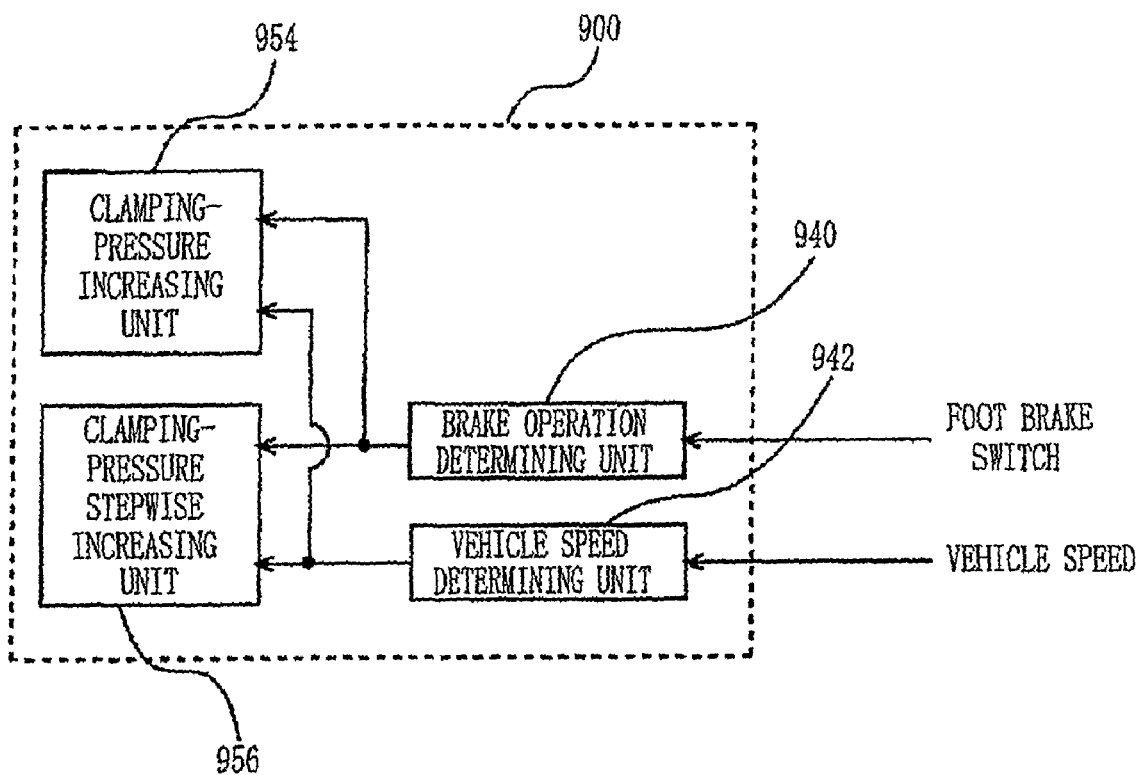
FIG. 9 is a block diagram illustrating the function of an ECU used as a control apparatus according to a second embodiment of the present invention.

The function of an ECU 900 used as the control apparatus according to the second embodiment of the present invention will be described below with reference to FIG. 9. The function, which will be described in the following description, may be executed using either hardware or software. Furthermore, the same or like elements described in both the first and second embodiments carry the same or like reference numerals, Thus, further explanation is omitted herein.

The ECU 900 comprises a clamping-pressure increasing unit 954 and a clamping-pressure stepwise increasing unit 956 in addition to the brake operation determining unit 940 and the vehicle speed determining unit 942.

In the second embodiment, when the brake operation determining unit 940 determines that the brake is being operated and the vehicle speed determining unit 942 determines that the vehicle speed is less than or equal to a threshold speed V(0), the clamping-pressure increasing unit 954 controls the SLS linear solenoid valve 2210 to increase the clamping pressure of the belt stepwisely to a pressure P(ON) that is higher than a normal pressure P(OFF), which is set when the brake is not being operated.

When the vehicle speed falls the threshold speed V(0) when the brake operation determining unit 940 determines that the brake is being operated, the clamping-pressure stepwise increasing unit 956 controls the SLS linear solenoid valve 2210 to gradually increase the clamping pressure of the belt at a predetermined gradient to the pressure level P(ON) that is higher than the normal pressure P(OFF). In other words, in comparison with the clamping-pressure increasing unit 954, the clamping-pressure stepwise increasing unit 956 reduces the rate of increase of the clamping pressure of the belt.

Figure 10:
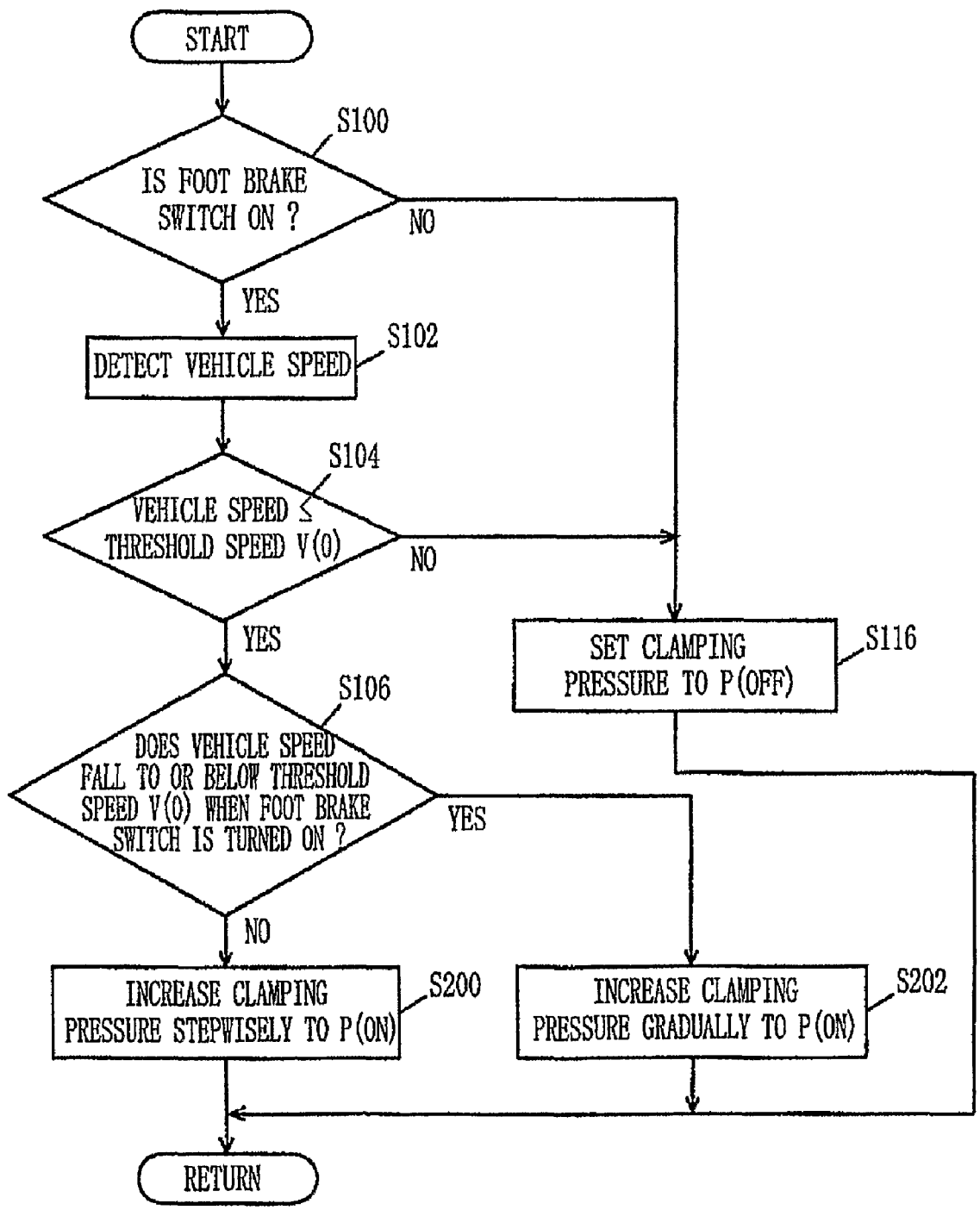
FIG. 10 is a flowchart of a control structure of a program executed by the ECU used as the control apparatus according to the second embodiment of the present invention.

Next, the control structure of a program executed by the ECU 900 used as the control apparatus according to the second embodiment of the present invention will be described with reference to FIG. 10. In the embodiment, the program is executed periodically at predetermined intervals. Further, the steps in the program common to both the first embodiment and the second embodiment carry the same step numbers, and further explanation of the same steps is thus deemed unnecessary.

At S200, the ECU 900 stepwisely increases the clamping pressure of the belt to the pressure level P(ON) that is higher than the normal pressure P(OFF), which is set when the foot brake switch 916 is turned off.

At S202, the ECU 900 gradually increases the clamping pressure of the belt at a predetermined gradient to the pressure level P(ON), which is higher than the normal pressure P(OFF), which is set the foot brake switch 916 is turned off.

The advantage of the second embodiment is that, in addition to the operational effects of the first embodiment, it prevents slippage of the transmission belt 510 on the pulleys during a quick braking operation, in addition to the operational effects of the first embodiment.

Next, the third embodiment of the present invention will be described. Unlike the first embodiment, in which an increase in the clamping pressure of the belt is prevented, the third embodiment increases the clamping pressure of the belt by an increase-amount in accordance with the vehicle speed. In the third embodiment, the general configuration and general function of the control apparatus remain the same as in the first embodiment, and further explanation of the same elements is thus not repeated.

Figure 11:
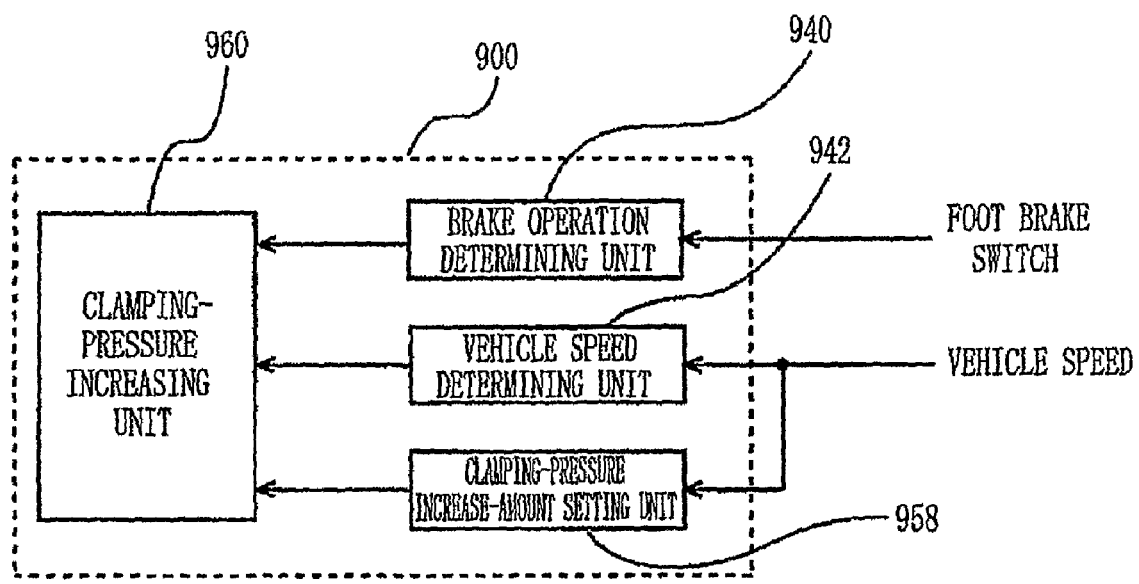
FIG. 11 is a block diagram illustrating the function of an ECU used as a control apparatus according to a third embodiment of the present invention.

The function of the ECU 900 used as the control apparatus according to the third embodiment of the present invention will be described below with reference to FIG. 11. The function, which will be described in the following description, may be executed using either hardware or software. Furthermore, the same or like elements described in both the first and second embodiments carry the same or like reference numerals. Thus, further explanation is omitted herein.

The ECU 900 comprises a clamping-pressure increase-amount setting unit 958 and a clamping-pressure increasing unit 960 in addition to the brake operation determining unit 940 and the vehicle speed determining unit 942.

In the third embodiment, the clamping-pressure increase-amount setting unit 958 sets the amount of increase of the clamping pressure of the belt, which is increased by the clamping-pressure increasing unit 960, according to the speed of the vehicle. When the vehicle speed is higher than the threshold speed V(0), the increase-amount is set to zero (i.e. the clamping pressure of the belt is not increased. However, when the vehicle speed is less than or equal to the threshold speed V(0), the increase-amount is set to a higher value in inverse proportion to the vehicle speed.

When the brake operating determining unit 940 determines that the brake is being operated and the vehicle speed determining unit 942 determines that the vehicle speed is less than or equal to the threshold speed V(0), the clamping-pressure increasing unit 960 according to the third embodiment controls the SLS linear solenoid valve 2210 to increase the clamping pressure of the belt by the increase-amount set by the clamping-pressure increase-amount setting unit 958.

Figure 12:
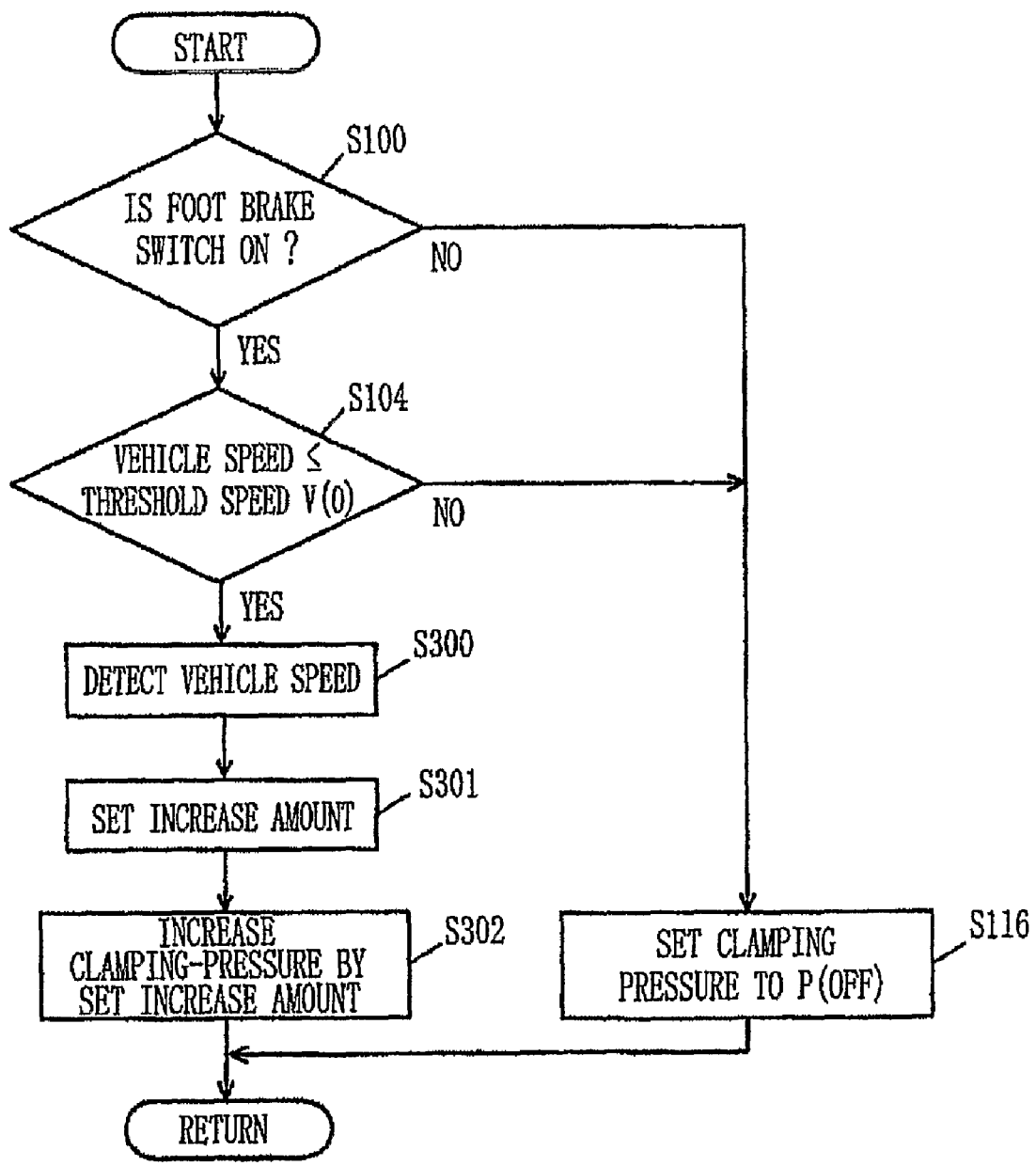
FIG. 12 is a flowchart of a control structure of a program executed by the ECU used as the control apparatus according to the third embodiment of the present invention.

Below, the control structure of the program executed by the ECU 900 will be described with reference to FIG. 12. In the embodiment, the program is executed at periodic intervals. Further, the steps in the program common to both the first embodiment and the third embodiment carry the same step numbers, and further explanation of the same steps is thus deemed unnecessary.

At S300, the ECU 900 detects the speed of the vehicle based on a signal output from the vehicle speed sensor 906. At S301, the ECU 900 sets the increase-amount of the clamping pressure of the belt according to the detected vehicle speed. At S302, the ECU 900 increases the clamping pressure of the belt by the set increase amount.

In the third embodiment, when the clamping pressure of the belt is increased, the increase-amount of the clamping pressure of the belt is reduced in inverse proportion to the vehicle speed. Thus, as in the first embodiment, the third embodiment imposes a stepwise increase in the clamping pressure of the transmission belt. Further, because the clamping pressure of the belt is increased, the third embodiment prevents slippage of the transmission belt 510 on the pulleys during a quick braking operation.

While the invention has been shown and described with respect to the example embodiments, it will be understood by those skilled in the art that various changes and modification may be made without departing from the spirit and scope of the invention as defined in the following claims.

The invention claimed is:

1. A control apparatus for a belt-driven continuously variable transmission comprising:
    a brake operation determining unit that determines whether a brake of a vehicle is being operated;
    a vehicle speed determining unit that determines whether a speed of the vehicle is less than or equal to a predetermined reference speed;
    a clamping pressure control unit that controls a clamping pressure applied to a transmission belt of the vehicle, wherein the clamping pressure control unit increases the clamping pressure if the brake operation determining unit determines that the brakes are being operated and the vehicle speed is less than or equal to the predetermined reference speed; and a clamping-pressure increase prohibition unit that prohibits increasing the clamping pressure applied to the transmission belt if a first condition that the vehicle speed falls to or below the predetermined reference speed when the brake operation determining unit determines that the brake is being operated is met.

2. The control apparatus for the belt-driven continuously variable transmission as set forth in claim 1, further comprising:

a vehicle deceleration determining unit that determines whether a deceleration of the vehicle is less than or equal to a predetermined reference deceleration, wherein a second condition for prohibiting increase in the clamping pressure applied to the transmission belt is that the vehicle deceleration determining unit determines that deceleration of the vehicle is less than or equal to the predetermined reference deceleration.

3. The control apparatus for the belt-driven continuously variable transmission as set forth in claim 2, further comprising:

an elapsed time determining unit that determines whether time elapsed since the operation of the brake began is greater than or equal to a predetermined reference time, wherein a third condition for prohibiting increase in the clamping pressure applied to the transmission belt is that the elapsed time determining unit determines that the elapsed time since the operation of the brake began is greater than or equal to the predetermined reference time.

4. The control for the belt-driven continuously variable transmission as set forth in claim 1, further comprising:

an elapsed time determining unit that determines whether time elapsed since the operation of the brake began is greater than or equal to a predetermined reference time, wherein an additional condition for prohibiting increase in the clamping pressure applied to the transmission belt is that the elapsed time determining unit determines that the elapsed time since the operation of the brake began is greater than or equal to the predetermined reference time.

5. The control apparatus for the belt-driven continuously variable transmission as set forth in claim 1, wherein the clamping pressure control unit increases the clamping pressure to a clamping pressure greater than the clamping pressure set when the brake are not being operated.

6. A control apparatus for a belt-driven continuously variable transmission, comprising:

a brake operation determining unit that determines whether a brake of a vehicle is being operated;

a vehicle speed determining unit that determines whether the vehicle speed is less than or equal to a predetermined reference speed;

a clamping pressure control unit that controls the clamping pressure applied to a transmission belt of the vehicle, wherein the clamping pressure control unit increases the clamping pressure if the brake operation determining unit determines that the brake is being operated and the vehicle speed is less than or equal to the predetermined reference speed; and a clamping-pressure increase-rate reducing unit that reduces a rate of increase in the clamping pressure applied to the transmission belt if the vehicle speed falls to or below the predetermined reference speed when the brake operation determining unit determines that the brake is being operated, wherein the clamping-pressure increase-rate is reduced to a lower increase-rate than when the speed of the vehicle does not fall to or below the predetermined reference speed.

7. The control apparatus for the belt-driven continuously variable transmission as set forth in claim 6, wherein the clamping pressure control unit increases the clamping pressure to a clamping pressure greater than the clamping pressure set when the brake are not being operated.

8. A control apparatus for a belt-driven continuously variable transmission, comprising:

a brake operation determining unit that determines whether a brake of a vehicle is being operated;

a vehicle speed determining unit that determines whether a speed of a vehicle is less than or equal to a predetermined reference speed;

a clamping pressure control unit that controls the clamping pressure applied to a transmission belt of the vehicle, wherein the clamping pressure control unit increases the clamping pressure if the brake is being operated and the vehicle speed is less than or equal to the predetermined reference speed; and a clamping-pressure increase-amount setting unit that sets an amount of increase in the clamping pressure of the transmission belt to zero if the vehicle speed is higher than the predetermined reference speed, and sets the amount of increase in the clamping pressure to a higher value as the vehicle speed decreases when the speed of the vehicle is less than or equal to the predetermined reference speed.

9. The control apparatus for the belt-driven continuously variable transmission as set forth in claim 8, wherein the clamping pressure control unit increases the clamping pressure to a clamping pressure greater than the clamping pressure set when the brake are not being operated.

10. A control method for a belt-driven continuously variable transmission, comprising:

determining whether a brake of a vehicle is being operated;

determining whether a speed of the vehicle is less than or equal to a predetermined reference speed;

controlling clamping pressure applied to a transmission belt of the vehicle, wherein the clamping pressure is increased when it is determined that the brake is being operated and the speed of the vehicle is less than or equal to the predetermined reference speed; and prohibiting an increase in the clamping pressure of the transmission belt, if a first condition that the speed of the vehicle falls to or below the predetermined reference speed when it is determined that the brake is being operated.

11. The control method for the belt-driven continuously variable transmission as set forth in claim 10, further comprising:

determining whether deceleration of the vehicle is less than or equal to a predetermined reference deceleration, wherein a second condition for prohibiting increase in the clamping pressure applied to the transmission belt is that the vehicle deceleration determining unit determines that deceleration of the vehicle is less than or equal to the predetermined reference deceleration.

12. The control method for the belt-driven continuously variable transmission as set forth in claim 11, further comprising:

determining whether time elapsed since operation of the brake is greater than or equal to a predetermined reference time, wherein a third condition for prohibiting increase in the clamping pressure applied to the transmission belt is that the elapsed time determining unit determines that the elapsed time since the operation of the brake began is greater than or equal to the predetermined reference time.

13. The control method for the belt-driven continuously variable transmission as set forth in claim 10, further comprising:
determining whether time elapsed since operation of the brake is greater than or equal to a predetermined reference time, wherein an additional condition for prohibiting increase in the clamping pressure applied to the transmission belt is that the elapsed time determining unit determines that the elapsed time since the operation of the brake began is greater than or equal to the predetermined reference time.

14. The control method for the belt-driven continuously variable transmission as set forth in claim 10, wherein in the controlling the clamping pressure, the clamping pressure is increased to a clamping pressure greater than the clamping pressure set when the brakes are not being operated.

15. A control method for a belt-driven continuously variable transmission, comprising:
determining whether a brake of a vehicle is being operated;
determining whether a speed of the vehicle is less than or equal to a predetermined reference speed;
controlling clamping pressure applied to a transmission belt of the vehicle, wherein the clamping pressure is increased when it is determined that the brake is being operated and the speed of the vehicle is less than or equal to the predetermined reference speed; and
reducing the clamping-pressure increase-rate of the transmission belt when the speed of the vehicle falls to or below the predetermined reference speed when it is determined that the brake is being operated, wherein the clamping-pressure increase-rate is reduced to a lower increase-rate than when the speed of the vehicle does not falls to or below the predetermined reference speed.

16. The control method for the belt-driven continuously variable transmission as set forth in claim 15, wherein in the controlling the clamping pressure, the clamping pressure is increased to a clamping pressure greater than the clamping pressure set when the brakes are not being operated.

17. A control method for a belt-driven continuously variable transmission, comprising:
determining whether a brake of a vehicle are being operated;
determining whether a speed of the vehicle is less than or equal to a predetermined reference speed;
controlling clamping pressure applied to a transmission belt of the vehicle, wherein the clamping pressure is increased when it is determined that the brake is being operated and the speed of the vehicle is less than or equal to the predetermined reference speed; and
setting a clamping pressure increase-amount of the transmission belt to zero when the vehicle speed is higher than the predetermined reference speed, and setting the clamping pressure increase-amount of the transmission belt to a higher value as the vehicle speed decreases when the speed of the vehicle is less than or equal to the predetermined reference speed.

18. The control method for the belt-driven continuously variable transmission as set forth in claim 17, wherein, in the controlling the clamping pressure, the clamping pressure is increased to a clamping pressure greater than the clamping pressure set when the brakes are not being operated.

19. A program for performing a control method for use in a belt-driven continuously variable transmission, comprising:
determining whether a brake of a vehicle is being operated;
determining whether a speed of the vehicle is less than or equal to a predetermined reference speed;
controlling clamping pressure applied to a transmission belt of the vehicle, wherein the clamping pressure is increased when it is determined that the brake is being operated and the speed of the vehicle is less than or equal to the predetermined reference speed; and
prohibiting an increase in the clamping pressure of the transmission belt, when the speed of the vehicle falls to or below the predetermined reference speed when it is determined that the brake is being operated.

20. A program for performing a control method for use in a belt-driven continuously variable transmission, comprising:
determining whether a brake of a vehicle is being operated;
determining whether a speed of the vehicle is less than or equal to a predetermined reference speed;
controlling clamping pressure applied to a transmission belt of the vehicle, wherein the clamping pressure is increased when it is determined that the brake is being operated and the speed of the vehicle is less than or equal to the predetermined reference speed; and
reducing the clamping-pressure increase-rate of the transmission belt when the speed of the vehicle falls to or below the predetermined reference speed when it is determined that the brake is being operated, wherein the clamping-pressure increase-rate is reduced to a lower increase-rate than when the speed of the vehicle does not falls to or below the predetermined reference speed.

21. A program for performing a control method for use in a belt-driven continuously variable transmission, comprising:
determining whether a brake of a vehicle is being operated;
determining whether a speed of the vehicle is less than or equal to a predetermined reference speed;
controlling clamping pressure applied to a transmission belt of the vehicle, wherein the clamping pressure is increased when it is determined that the brake is being operated and the speed of the vehicle is less than or equal to the predetermined reference speed; and
setting a clamping pressure increase-amount of the transmission belt to zero when the vehicle speed is higher than the predetermined reference speed, and setting the clamping pressure increase-amount of the transmission belt to a higher value as the vehicle speed decreases when the speed of the vehicle is less than or equal to the predetermined reference speed.

22. A recordable medium for storing a program for performing the control method for use in a belt-driven continuously variable transmission by a computer, the control method comprising:
determining whether a brake of a vehicle are being operated;
determining whether a speed of the vehicle is less than or equal to a predetermined reference speed;
controlling clamping pressure applied to a transmission belt of the vehicle, wherein the clamping pressure is increased when it is determined that the brake is being operated and the speed of the vehicle is less than or equal to the predetermined reference speed; and
prohibiting an increase in the clamping pressure applied to the transmission belt, when the speed of the vehicle falls to or below the predetermined reference speed when it is determined that the brake is being operated.

23. A recordable medium for storing a program for performing the control method for use in a belt-driven continuously variable transmission by a computer, the control method comprising:

determining whether a brake of a vehicle is being operated;

determining whether a speed of the vehicle is less than or equal to a predetermined reference speed;

controlling clamping pressure applied to a transmission belt of the vehicle, wherein the clamping pressure is increased when it is determined that the brake is being operated and the speed of the vehicle is less than or equal to the predetermined reference speed; and reducing the clamping-pressure increase-rate of the transmission belt when the speed of the vehicle falls to or below the predetermined reference speed when it is determined that the brake is being operated, wherein the clamping-pressure increase-rate is reduced to a lower increase-rate than when the speed of the vehicle does not falls to or below the predetermined reference speed.

24. A recordable medium for storing a program for performing the control method for use in a belt-driven continuously variable transmission by a computer, the control method comprising:

determining whether a brake of a vehicle is being operated;

determining whether a speed of the vehicle is less than or equal to a predetermined reference speed;

controlling clamping pressure applied to a transmission belt of the vehicle, wherein the clamping pressure is increased when it is determined that the brake is being operated and the speed of the vehicle is less than or equal to the predetermined reference speed; and setting an amount of increase in the clamping pressure applied to the transmission belt to zero when the vehicle speed is higher than the predetermined reference speed, and setting the amount of increase in the clamping pressure to a higher value as the vehicle speed decreases when the speed of the vehicle is less than or equal to the predetermined reference speed.

* * * * *